US006570578B1

United States Patent
Smirnov et al.

(10) Patent No.: US 6,570,578 B1
(45) Date of Patent: May 27, 2003

(54) SYSTEM FOR AUTOMATIC GENERATION OF SELECTIVE PARTIAL RENDERINGS OF COMPLEX SCENES

(75) Inventors: Alexis Smirnov, Montreal (CA); Jean-Marc Krattli, Paris (FR)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/107,993

(22) Filed: Jun. 30, 1998

Related U.S. Application Data (60) Provisional application No. 60/080,584, filed on Apr. 3, 1998.

(51) Int. Cl.[7] .................................................. G09G 5/00
(52) U.S. Cl. ........................ 345/629; 345/581; 345/473
(58) Field of Search ................................ 345/420, 429, 345/435, 581, 629, 630, 422, 426, 473, 589, 634

(56) References Cited

PUBLICATIONS

Lengyel et al ("Rendering with Coherent Layers": Proceedings of the 24th annual conference on Computer Graphics & Interactive techniques: Aug. 3–8, 1997, Los Angeles, CA).*
Francis Hamit (Digital Imaging meets theme park ride planning at Boss Films: Advanced Imaging, v10, n3, p72(4): Mar. 1995).*
Donna Coco, "CG that gives you the creeps": Computer Graphics World, Mar. 1998.*

* cited by examiner

Primary Examiner—Mano Padmanabhan
(74) Attorney, Agent, or Firm—Peter J. Gordon (57) ABSTRACT

A computer-based system automates the production of so-called pass-images (or just "passes") from data defining 3-D scenes. For example, a beauty pass of a selected object shows the normal surface appearance without any background or other objects. A shadow pass shows only selected shadows and a highlight pass, only selected highlights. The passes allow pixel-processing to be done efficiently. The processed passes can then be combined ("composited") to form the finished image. In the past, these passes were produced by editing a copy of the 3-D scene for each pass and rendering the edited copy. The invention automates the production of passes by filtering the 3-D scene through pre-specified pass definitions that override properties of the 3-D scenes. The results of filtering are rendered (rendering largely comprises the process of ray-tracing) to form the passes. The system stores numerous pass definitions. Each time the 3-D scene is edited, the passes can be produced automatically from the pass definitions. This automation of pass production also allows the passes to be used in the authoring environment by allowing a pass preview of the 3-D scene rendering. The automation of pass-production provides a tool that goes beyond merely reducing the labor involved in creating passes, it provides the author the option of invoking a new perspective, a different kind of immediate feedback, right in the authoring environment. This feedback enhances the author's ability to focus on specific features of a scene as the author edits the 3-D scene itself.

8 Claims, 6 Drawing Sheets

SYSTEM FOR AUTOMATIC GENERATION OF SELECTIVE PARTIAL RENDERINGS OF COMPLEX SCENES

This application claims priority to Application Serial No. 60/080,584 filed Apr. 3, 1998.

FIELD OF THE INVENTION

The invention relates to systems for the production of rendered 2-D images derived from 3-D scene data using computers and more particularly to a system that automates the production of separate sequences of rendered images, known as passes, which are to be used with compositing software to form a completed image or image sequence.

BACKGROUND

Modern computer graphics, as often seen in movies and computer-generated artwork, consist of two-dimensional (2-D) images or image sequences (movies) that are derived from complex 3-D data. The 3-D scene data includes the 3-D coordinates of every object in a scene. Since the images derived from the scene are intended to show a realistic representation of actual 3-D objects, the scene data also includes objects or definitions, called "shaders," that are used to control rendering related properties of objects and the scene as a whole, for example, surface and volume properties of each object. For instance, the shaders dictate how light is reflected, refracted, and scattered by the objects. Shaders can also be used to control the rendering properties of internal volumes of space (e.g., a 3D object that delimits a puff of smoke) or the entire scene environment, the latter being called an environmental shader.

To make the realistic image, the 3-D scenes are rendered. The process of rendering involves ray-tracing which determines the look of each pixel visible from the camera viewpoint. In ray-tracing, the effects of occultation and diffuse and specular reflection, refraction, and diffusion of light by the various objects and volumes in the scene are determined. Ray tracing not only accounts for primary effects which are the reflections, refractions, and diffusions of light coming directly from the light sources, but also for secondary reflections. The latter are effects when primary light from other objects illuminates or passes through an object or volume. These secondary effects can involve multiple reflections between the original light source and the camera so that, considering that rays must be traced for every pixel in a scene and considering that some shaders involve complex numerical algorithms, the process of rendering is extremely time consuming for current computer technology.

To speed up the process of authoring such images and image-sequences (the latter corresponding to animation as opposed to still images), graphic artists generate images that include particular features of the final image which, when combined (or perhaps with others if not all essential passes are generated), form a complete image or image sequence. For example, a so-called matte pass shows only the outline of a first object. That is, it shows only the parts of the objects behind the first object that are not occulted by it. In such a pass, the first object might appear solid white with no surface features at all. Another pass could be a shadow pass showing only the shadow created by an object or group of objects. These passes are combined to form a final image in a process called compositing.

Breaking a final rendered image into these passes and subsequently compositing the passes allows an intermediate process, prior to compositing, where specific features of the final image may be modified by editing the pass images using pixel editing software. Various features may be tweaked without going back to the original 3-D models. For example, the darkness or hue of a shadow may be tweaked by editing a shadow pass image. The subsequent process of compositing is performed quickly to provide a full final image. The artist can then return to the passes to make further changes and again re-composite to see the results. Since the compositing operation, which starts with the passes, runs very quickly, this process of tweaking pixel properties can be done iteratively and quickly to refine the images. The alternative, for the example changing the shadow, would require changing the lighting in the 3-D scene data to produce the desired effect. This would require a re-rendering of the entire scene, which takes a long time.

The following are various types of passes that can be created. A beauty pass is a full rendering of a selected object of a group of objects. The beauty pass renders the entire scene with no modifications. A matte pass shows an outline of a selected object with the surface of the object appearing uniformly which, so that it demarcates a silhouette of the object. The background and non-selected objects are invisible in the matte pass. A shadow pass shows only a shadow generated by an object with the object generating the shadow and other objects (as well as the background) not appearing upon rendering. A highlight pass shows only the surfaces of selected objects that appear bright due to specular reflection with the rest of the scene flagged as invisible. A transparency pass is a beauty pass of one or more transparent selected objects with the rest of the scene flagged as invisible. A refraction pass shows only light refracted through one or more selected objects with the rest of the scene flagged as invisible. This list is by no means exhaustive and is provided by way of example to facilitate the purposes of this disclosure.

Obviously, only some modifications can be made efficiently by pixel-editing the pass images. Certain modifications are only efficiently done by returning to the 3-D scene. For example, if the shape of an object must be changed, the complex modifications that have to implemented such as highlighting, shading, and the details of the shape, require editing of the 3-D model of the object defined in the scene.

Figure 1:
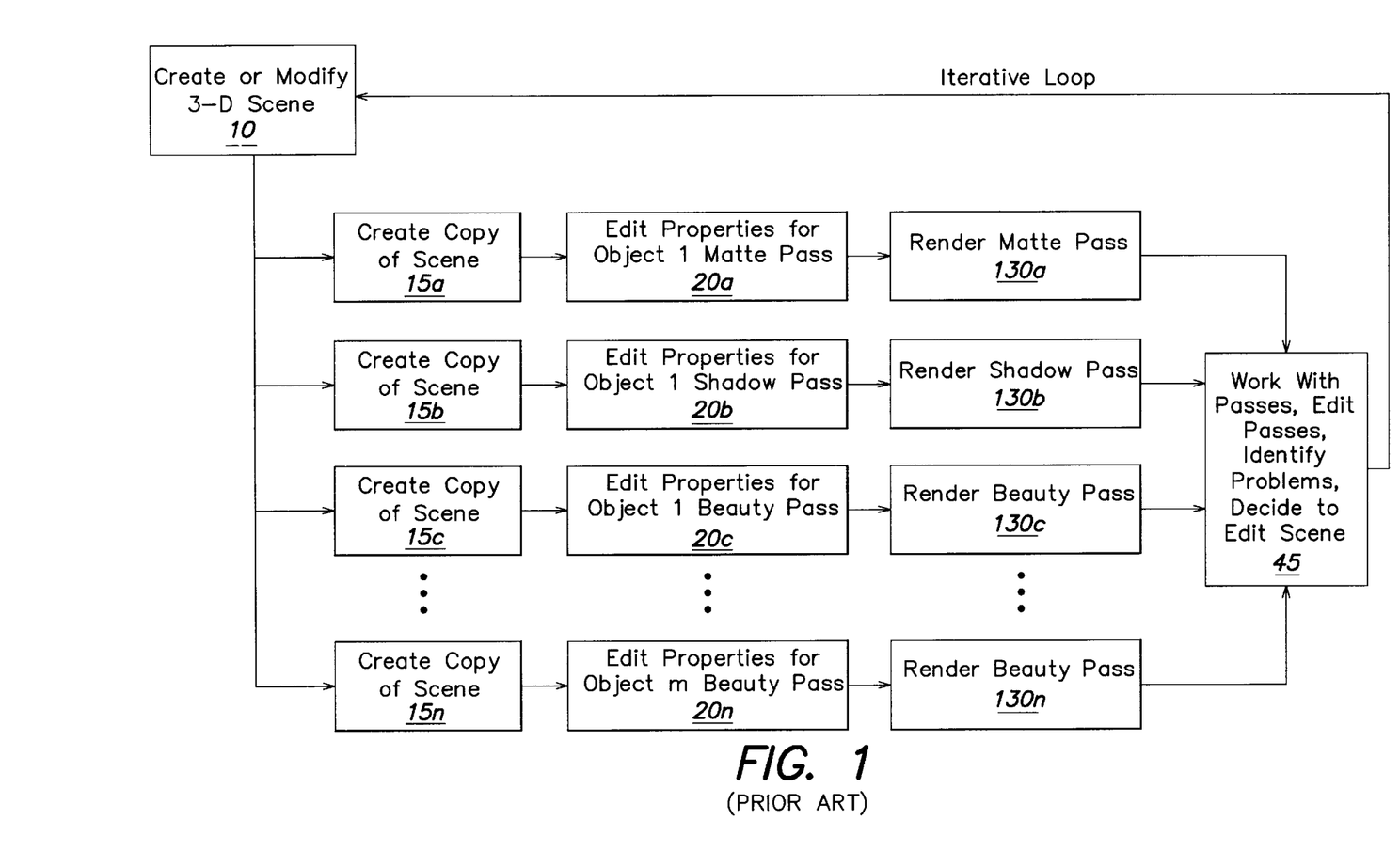
FIG. 1 is a diagram showing a workflow for working with passes according to the prior art.

Referring to FIG. 1, the process of generating passes after creating or editing the step of three-dimensional scene 10 involves several steps. First, a number of copies of the scene are made 15a–15n. Then each copy is edited 20a–20n to modify the properties as appropriate for the respective pass to be generated. For example, to generate the matte pass for a first object, the user sets the surface shaders of the object such that the object will appear totally white when this version of the scene is rendered. The same is done for each object for which a matte pass is to be generated. For another example, to generate a beauty pass for the first object, another copy of the scene is made and modified to set the shaders of all but the first object transparent or "zero-alpha." Thus, each time a scene is edited, a copy is made for each pass and pass-specific parameters of the copy set to generate each particular pass. This is because changes in the 3-D scene may (and probably do) affect every single pass. Next, each edited copy is rendered to create the particular pass. The user works with the passes in step 45 and may decide to edit the 3-D scene. The process of generating a new set of passes is the same as before. The author returns to the step of editing the scene 10 and follows the same procedure to produce a new set of passes. This process of editing copies of scenes to generate passes may be tedious and time consuming. The tasks indicated by dark-bordered boxes are labor-intensive activities. Each must be repeated every time the scene is edited.

SUMMARY OF THE INVENTION

The invention is a system for method for automating the process of creating pass-definition (passes) from a three-dimensional scene. The invention allows a user to define, in a separate step, a series of pass definitions. Each pass definition includes properties that override those defined in the scene. When a given pass definition is applied to the 3-D scene, the system automatically changes the scene according to the pass definition. Once the pass is set as active, the scene is rendered to produce a respective pass-image or image sequence, or, simply, "pass".

Consider, for example, the steps for making the matte pass. In the invention, the definition of a matte pass is broken out as a separate process. The properties may be assigned to objects through object-groupings called partitions. Thus, the pass definition may identify a particular partition and a particular set of property values per partition. All objects defined in the scene as belonging to that particular partition will then inherit the properties of the partition. Partitions may be hierarchical with parent partitions passing their properties by inheritance to respective child partitions, which pass on their properties to objects, or further progeny partitions. For example, in a matte pass definition for a first constellation of objects defined as belonging to a first partition, the first partition is identified along with the override property and value to be applied. So the definition might say partition 1, shader hue =white, transparency =0%, or some more technically efficient equivalent. These new values override the shaders applied in the scene definition. So if partition 1 is a group of dinosaur scales that are defined with all sorts of colors and reflectivities in the scene definition, all these shaders are replaced by the shaders of the partition. This causes the dinosaur to appear totally white upon rendering. In the same pass definition, the properties of all other objects are automatically overwritten so that these objects are invisible upon rendering. The resulting matte pass can then be used for tweaking of the 2-D image and/or compositing as taught in the prior art.

The various passes attached to a scene are maintained on the system to allow them to be manipulated and re-composited as desired. Compositing is done conventionally and outside the system defined by the invention. As mentioned, the single scene description is used to render the various pass-specific images or image-sequences.

An important motivation for automating the process of generating render passes can be found in considering the in-context rendering invention described a copending US Patent Application entitled "A System for Editing Complex Visual Data Providing a Continuously Updated Rendering," the entirety of which is incorporated herein by reference. The in-context rendering system provides a rendering in the authoring environment itself. This helps the author tune geometric and non-geometric (surfaces, light-diffusion effects, light intensity, etc.) properties of the scene by providing continuous feedback on how a final rendering is affected by the author's modifications to the scene. The in-context rendering system allows the author to focus on particular geometric features of the scene by tailoring the render region image's size and the objects shown. Automating the process of making passes allows a step of filtering the scene through a currently-selected pass definition before applying the rendering technology described in the in-context rendering disclosure. This means that the rendering displayed in the authoring environment can be formed according to any selected pass definition. This allows the author to focus even more narrowly on certain features of the scene as the author works. For example, the author can select a highlight pass as current and tune the 3-D parameters that give rise to the highlight. Compare this to the prior art process of editing the 3-D scene data to obtain the highlight, rendering a preview of the edited scene, and then going back and editing the 3-D scene again. Thus, the automation of forming rendering passes provides a tool in the authoring environment that goes beyond merely reducing the labor involved in creating passes for purposes of pixel-tweaking the image. It also provides the author the option of invoking a new perspective, a different kind of immediate feedback, right in the authoring environment. This feedback enhances the author's ability to focus on specific features of a scene as the author edits the 3-D scene itself.

The system automates the production of so-called pass-image sequences (or just "passes") from data defining 3-D scenes. The invention automates the production of passes by filtering the 3-D scene through pre-specified pass definitions that override properties of the 3-D scenes. The results of filtering are rendered (rendering largely comprises the process of ray-tracing) to form the passes. The system may store numerous pass definitions. Each time the 3-D scene is edited, the passes can be produced automatically from the pass definitions. This automation of pass production also allows the passes to be used in the authoring environment by allowing a pass preview of the 3-D scene rendering. The automation of pass-production provides a tool to expedite editing of the 3-D scene by providing the pass preview in the authoring environment. This automation also allows passes to be produced without the substantial manual labor ordinarily required in editing the 3-D scene.

According to an embodiment the invention provides a method for creating a two-dimensional image from a three-dimensional scene. The steps include defining a scene including geometry and a first surface characteristic definition of at least one object. A rendering of the scene produces an image of the object which is determined, at least in part, by the first surface characteristic. A result of the defining step is stored in a computer. The user may then edit a pass definition, a result of the editing being a pass definition that includes a second surface characteristic definition of the object. The surface characteristics may be any non-geometric property. A result of the editing is stored in the computer. As the user activates a particular pass, the partition properties overlay the original properties of the object (s). The rendering is generated in the context of the active pass.

According to another embodiment, the invention is a method for creating and working with pass images (or image sequences) from a three-dimensional scene. The steps include storing a scene including scene geometric and scene non-geometric properties of objects. The next step in this embodiment is storing pass definitions, each including at least one override non-geometric property of at least one of the objects. The next step is filtering a respective copy of the scene using each of the stored pass definitions such that the at least one override non-geometric property is used to determine an appearance of a rendering of the respective pass. A result of the step of filtering is that a scene non-geometric property of the respective copy is superseded by the override non-geometric property such that the scene non-geometric property is not used to determine an appearance of the rendering of the respective pass. The last step may consist of rendering of the pass producing images of the objects which are determined, at least in part, by the non-geometric properties.

According to yet another embodiment, the invention is a method of providing an image of a scene. The steps are: receiving scene definition data and storing the scene definition data, the scene definition data including geometric and non-geometric properties; receiving pass definition data and storing the pass definition data the pass definition data including non-geometric properties; rendering a view of a scene defined by the stored scene definition data, to produce an image, responsively to the stored scene definition data and the stored pass definition data. The rendering is such that a non-geometric property in the scene definition is replaced by a non-geometric property in the pass definition. Another step is displaying the image while accepting modifications to the scene definition and using the modifications to update the scene definition data; and updating the rendering responsively to the step of accepting. An additional step that may be added is receiving render-view definition data, storing the render-view definition data, the step of rendering a view being performed responsive to the render-view definition data. The step of rendering may be performed asynchronously with respect to the steps of receiving. The pass definition data may include multiple partitions—mutually exclusive groups of scene objects. Also, the step of rendering may include rendering the view responsively to the current pass to the exclusion of other passes.

According to still another embodiment, the invention is a method of producing a user-interface for authoring 3-D scenes. The steps include receiving scene definition changes and modifying a stored scene definition responsively to the changes, the stored scene definition containing geometric and non-geometric parameters of the 3-D scene. The steps further include receiving data indicating a selection of one of multiple pre-defined pass definitions, each defining at least one non-geometric parameter of the scene. At least some of the non-geometric parameters in the multiple pre-defined pass definitions are redundant with respect to corresponding non-geometric parameters in the stored scene definition. Further steps include displaying an abstract image of a scene responsively to the first step of receiving and finally displaying a rendered image of the scene responsively to both of the steps of receiving.

According to still another embodiment, the invention is a method of iteratively and automatically producing a rendering that may displayed in an authoring user interface each time a 3-D scene is modified through the authoring user-interface. The steps include storing pass definitions, each of which defines properties of the 3-D scene. The steps further include selecting one of the pass definitions as current responsively to changes in the 3-D scene entered by an author into the authoring user-interface. The steps further include determining properties to be used in the rendering according to one of the stored pass definitions selected in the step of selecting, such that any property of the one of the pass definitions that corresponds with a property of the 3-D scene supersedes the property of the 3-D scene. Finally the method calls for rendering the 3-D scene responsively to the superseding properties determined in the step of determining.

According to still another embodiment, the invention is a method in a computer system for producing pass-images of a 3-D scene, comprising: (1) storing a 3-D scene defining properties that determine an appearance of an image obtained by rendering the 3-D scene; (2) storing pass data sets, each defining override properties corresponding to the 3-D scene; (3) storing an indication of selected ones of the pass data sets according to which the 3-D scene is to be rendered; (4) rendering the 3-D scene, at least once with each pass set as active or current, using at least one of the override properties of the each of the pass data sets instead of at least one corresponding one of the properties of the 3-D scene, whereby at least one image or image sequence is produced for each of the pass definitions. A step of storing the at least one image or image sequence for each of the pass data sets may be added. A step of editing at least one of the at least one image for each of the data sets may also be added.

According to still another embodiment, the invention is a method in a computer system for creating. and working with pass-images of a 3-D scene. The method includes storing a 3-D scene defining properties that determine an appearance of an image obtained by rendering the 3-D scene. The method further includes storing pass data sets, each defining override properties corresponding to the 3-D scene. The method still further includes selecting one of the pass data sets and rendering, for the selected pass data set, such that at least one of the override properties of each of the pass data sets determines a rendered image resulting therefrom instead of the corresponding property of the 3-D scene. Finally, the method calls for editing the 3-D scene while displaying the rendered image. The method may include rendering the 3-D scene for at least two of the stored pass data sets and compositing pass images resulting therefrom. The method may also include editing the pass images prior to the step of compositing. The method may also include editing the 3-D scene and repeating the step of rendering with identical pass data sets.

According to still another embodiment, the invention is a method of generating a user-interface on a computer for authoring a three-dimensional scene. The method includes storing a 3-D scene in a memory and receiving edits to the 3-D scene, the edits being applied by a user and including modifications to 3-D properties of objects defined by the 3-D scene. The method also includes, substantially simultaneously with, but asynchronously with respect to, the step of receiving, generating a rendered view of the 3-D scene. The rendered view is responsive to a selected set of parameters, the set of parameters being one of a group of sets of parameters relating to the 3-D scene. Finally, the steps of receiving and generating are repeated. The rendered view may be displayed substantially simultaneously with the step of receiving. The sets of parameters may include parameters that replace parameters in the 3-D scene such that the rendered view is determined by parameters of the selected set of parameters rather than by replaced parameters of the 3-D scene.

DETAILED DESCRIPTION OF THE PREFERRED EMBODIMENTS

Figure 1A:
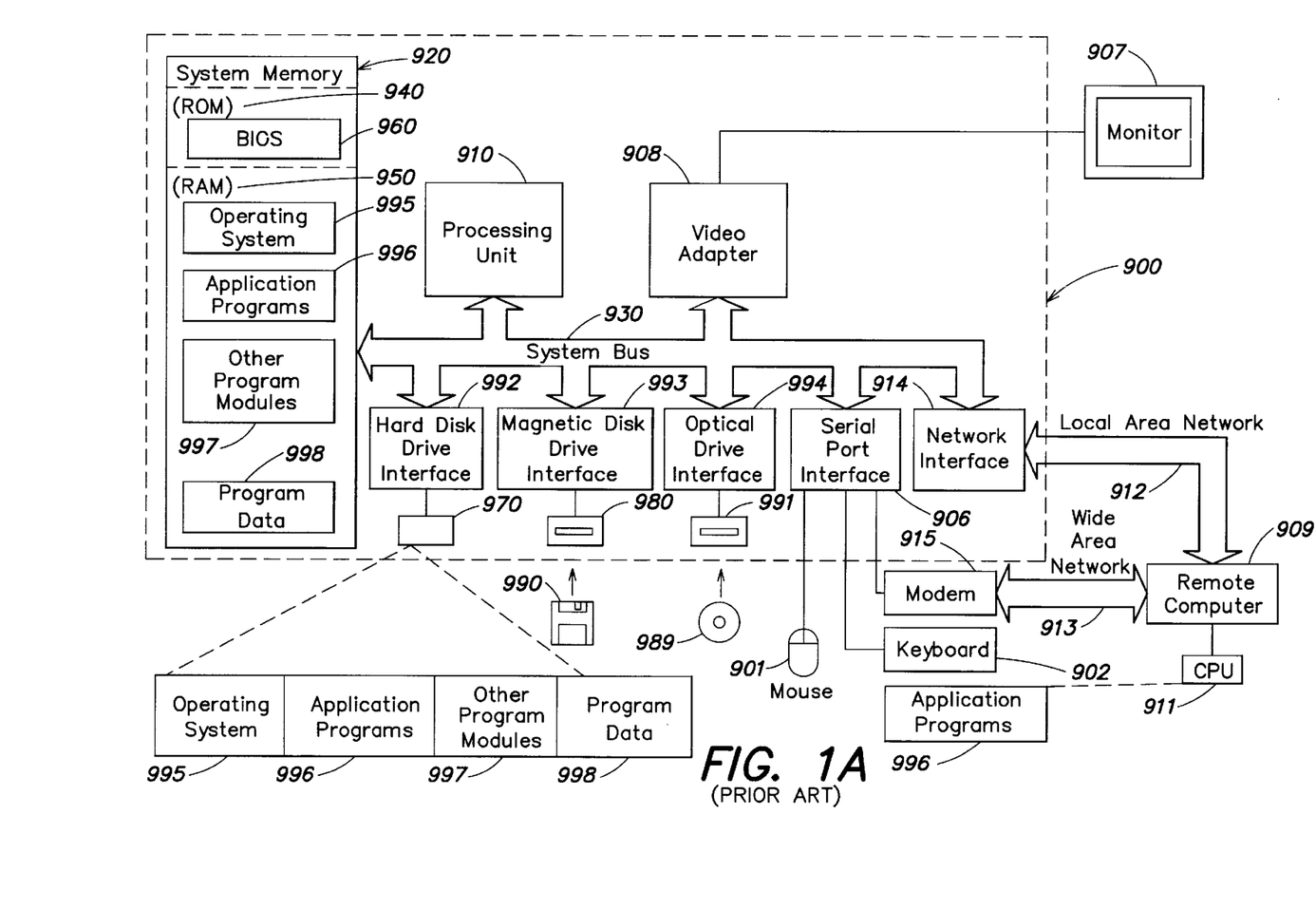
FIG. 1A illustrates a conventional computer system according to the prior art.

Referring to FIG. 1A, a suitable computing environment in which the invention may be implemented, with various computer system configurations such as the one depicted. Note that the invention may be practiced in distributed computing environments, where tasks are performed by remote processing devices linked through a communications network with program modules located in local and/or remote storage devices. An exemplary system includes a conventional personal computer 900, with a processing unit 910, a system memory 920, and a system bus 930 interconnecting system components, including the system memory to the processing unit 910. The system bus 930 may be any structure including a memory bus or a memory controller, a peripheral bus, or a local bus. The system memory includes read only memory (ROM) 940 and a random access memory (RAM) 950. A basic input/output system 960 (BIOS), containing the basic routines that helps to transfer information between elements within the personal computer 900, such as during start-up, is stored in ROM 940. The personal computer 900 further includes a hard disk drive 970, a magnetic (e.g., floppy) disk drive 980 with a removable magnetic disk 990, and an optical disk drive 991 with a removable optical disk 989. The hard disk drive 970, magnetic disk drive 980, and optical disk drive 991 are connected to the system bus 930 by a hard disk drive interface 992, a magnetic disk drive interface 993, and an optical disk drive interface 994, respectively. Other types of computer readable media may be used to store data as well, such as magnetic cassettes, flash memory cards, digital video disks, Bernoulli cartridges, random access memories (RAMs), read only memories (ROMs), and the like.

Program modules may be stored on the hard disk, magnetic disk 990, optical disk 992, ROM 940 or RAM 950, including an operating system 995, one or more application programs 996, other program modules 997, and program data 998. A user may enter commands and information into the personal computer 900 through input devices such as a keyboard 902 and a pointing device 901. Other input devices (not Shown) may include a microphone, joystick, game pad, satellite dish, scanner, or the like. These and other input devices are often connected to the processing unit 910 through a serial port interface 46 that is coupled to the system bus, but may be connected by other interfaces, such as a parallel port, game port or a universal serial bus (USB). A monitor 907 or other type of display device is also connected to the system bus 930 via an interface, such as a video adapter 908. In addition to the monitor, personal computers typically include other peripheral output devices (not shown), such as speakers and printers.

The personal computer 900 may operate in a networked environment using logical connections to one or more remote computers, such as a remote computer 909. The remote computer 909 may be another personal computer, a server, a router, a network PC, a peer device or other common network node, and typically includes many or all of the elements described above relative to the personal computer 900, although only a CPU 911 has been illustrated in FIG. 1. The logical connections depicted in FIG. 1 include a local area network (LAN) 912 and a wide area network (WAN) 913. Such networking environments are commonplace in offices, enterprise-wide computer networks, intranets and the Internet.

When used in a LAN networking environment, the personal computer 900 is connected to the local network 912 through a network interface or adapter 914. When used in a WAN networking environment, the personal computer 900 typically includes a modem 915 or other means for establishing communications over the wide area network 913, such as the Internet. The modem 915 is connected to the system bus 930 via the serial port interface 906. In a networked environment, program modules, or portions thereof, may be stored in the remote memory storage device. It will be appreciated that the network connections shown are exemplary and other means of establishing a communications link between the computers may be used.

As is familiar to those skilled in the art, the computer system 900 further includes an operating system and at least one application program. The operating system controls the computer system's operation and the allocation of resources. The application program is a set of software that performs a task desired by the user, making use of computer resources made available through the operating system. Both may be resident in the illustrated memory 920 or in another store as suggested above.

In accordance with the practices of persons skilled in the art of computer programming, the invention may be described with reference to acts and symbolic representations of operations that are performed by the computer system 900, unless indicated otherwise. Such acts and operations are sometimes referred to as being computer-executed. It will be appreciated that the acts and symbolically represented operations include the manipulation by the CPU 911 of electrical signals representing data bits which causes a resulting transformation or reduction of the electrical signal representation, and the maintenance of data bits at memory locations in the memory system 920 to thereby reconfigure or otherwise alter the computer system's operation, as well as other processing of signals. The memory locations where data bits are maintained are physical locations that have particular electrical, magnetic, optical, or organic properties corresponding to the data bits.

In an illustrative embodiment of the invention, the computer system 900 preferably uses the Windows 95 or Windows 98 client server operating system. However, other client/server operating systems (e.g. Windows NT, O/S2 by IBM, Mac OS, UNIX, Windows CE, etc.) can also be used. A client/server operating system is an operating system which is divided into multiple processes of two different types: server processes, each of which typically implements a single set of services, and client processes, which request a variety of services from the service processes. Object oriented programming is used to design the client/server operating system, and applications which run under the client/operating system, where objects represent system resources.

For example, the Windows 95 client/server operating system provides shareable resources, such as files, memory, processes and threads, which are implemented as "objects" and may be accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within the computer memory 920 and represent specific electrical, magnetic or organic elements.

An "object type," also called an "object class," comprises a data-type, services that operate in instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through the object pointer. An application obtains this object reference by using some type of function call (direct or implied) in which that function allocates an object block in computer memory, initializes the function table, and returns the reference to the computer memory to an application. The computer memory may be local or distributed on a remote computer.

The Windows 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In an illustrative embodiment of the invention, processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the threads process. Thus, the actual data comprising a threads context varies as it executes.

Figure 2A:
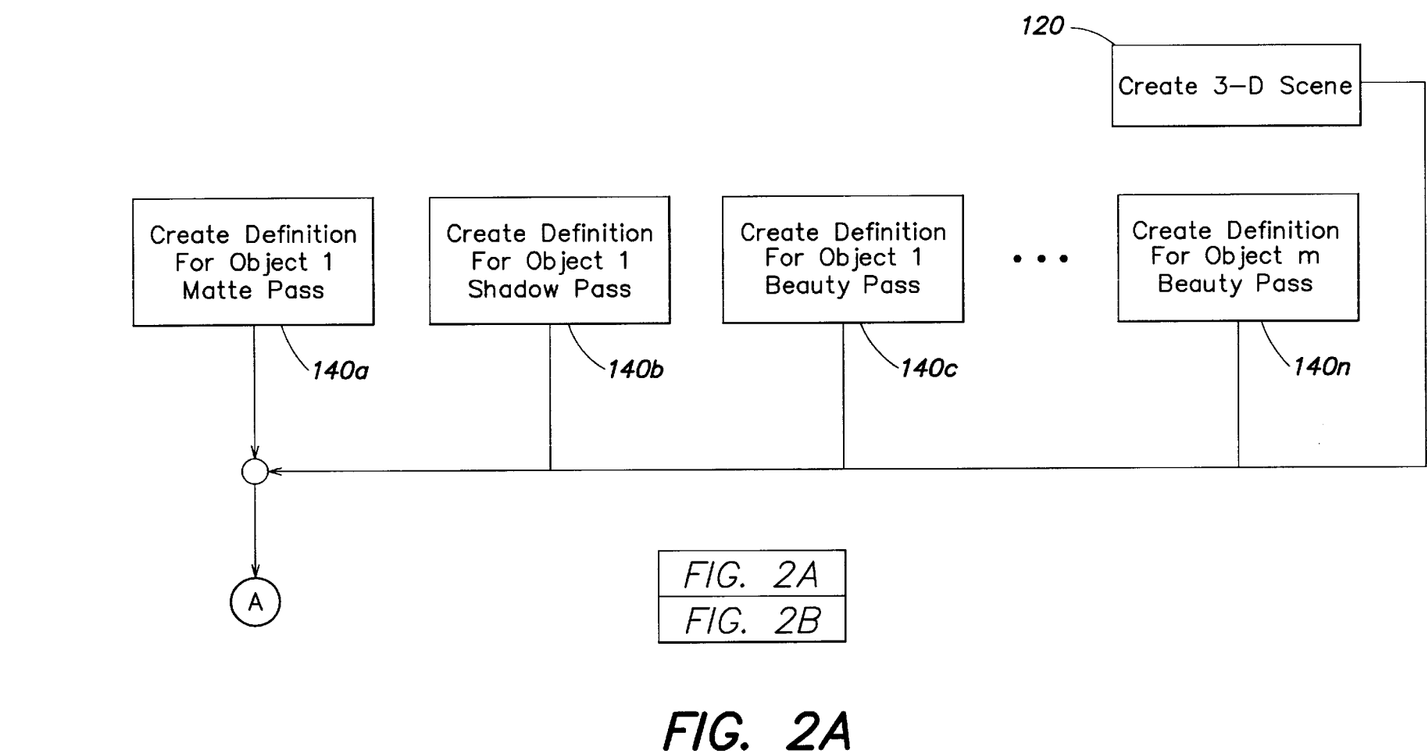
FIG. 2A and FIG. 2B are diagrams showing a workflow for working with passes using the invention.
Figure 2B:
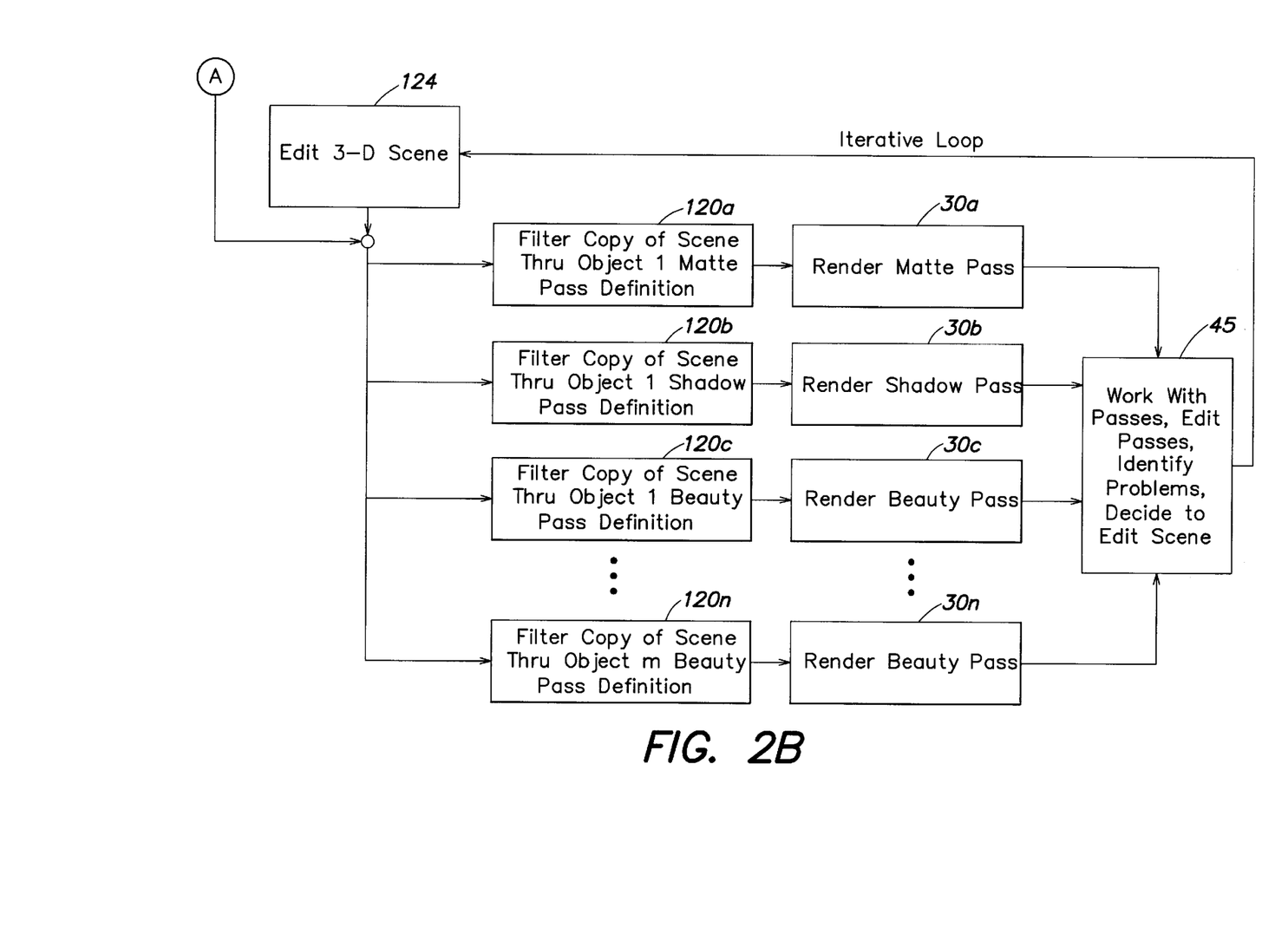

Referring to FIGS. 1 and 2, the invention allows a user to create a respective definition for each pass. Although FIGS. 1 and 2 show only one pass for each type, it is understood that a user may generate only a subset or a superset of the types of passes shown and that multiple ones of each type may be generated, each being defined with respect to a different set of objects. According to the invention, the user follows a procedure outlined in FIG. 2. A computer program supporting the creation and maintenance of multiple rendering passes supplies an interface for the creation and modification of pass definitions. A number of predefined ("canned," "off-the-shelf,") definitions may be partially or fully created and available for modification. These pass definitions contain all the parameter variations required to generate a pass-scene from the scene data such that rendering of the pass-scene results in a respective pass. For example, the pass definition for a matte pass would require the selection of the object(s) for which the matte is to be formed and may provide for particulars regarding the RGB values to be used in forming the opaque regions. Other parameters that would be defined in the various pass definitions may include:

1. rendering options such as image resolution, sampling settings, output image name;
2. environmental shader settings such as defining a fog or rain;
3. output shader settings, for example, a glow output shader can be defined;
4. camera settings indicating the particular camera object to be used;
5. geometric partitions of the scene, each partition consisting of a set of objects, properties for each of the partitions overriding the individual properties (e.g., rendering properties such as visibility or surface properties) of objects belonging to the partition;
6. light partitions defining properties of light and overriding the individual properties defined in the scene, for example, whether a source is a point or area source;
7. background geometry settings defining a default partition for properties of objects not belonging to another partition and defining override properties for such objects;
8. background light settings defining a default partition for properties of light objects not belonging to another light partition and defining override properties for such light objects.

In the preferred embodiment, the pass definitions are not used to add objects to the scene nor for changing animation settings. Returning now to the process shown in FIG. 2, the user creates or modifies a selected of pass definitions 140e–140n. Again, there may be multiple incidents of a given type, each relating to different object groupings or some other parameter variation. Whenever the user modifies the 3-D scene 124, the scene data is filtered through the pass definitions 120a–120n resulting in a respective pass for each.

The workflow involved in generating passes using the invention (FIG. 2) is substantially different from the workflow according to the prior art (FIG. 1). First, a scene is automatically copied and each copy filtered through the pass definitions 120a–120n. These pass-scenes are rendered to produce the passes. The author works with the passes 45 and, when the author decides to edit the 3-D scene 124, the author has only to edit the scene. All the other steps are performed automatically or semi-automatically using the previously-defined pass definitions. Again, the manually intensive steps are shown in dark-bordered boxes.

As can be seen by comparing FIGS. 1 and 2, the creation of the pass definitions results in the removal of a great deal of work from the process of creating and re-creating passes. One benefit is that the authoring system may be supplied with template pass definitions that can be implemented by simply entering the minimal required data. For example, a matte pass definition may already have the appropriate property definitions for the transparent and plain white shaders predefined. It would only be necessary to add the appropriate partitions identities to customize the matte pass definition. Defaults may be provided to make this even faster, for example, all partitions may be automatically provided with transparent shaders when a first set is identified with the matte. Then, the author does not need to specify all the remaining partitions to associate these with the transparent shader property. Of course other defaults may be implemented as desired. For example, all camera selections may be defaulted to a first or global selection and the camera selection modified for a given pass definition if desired. In this way, the camera selection does not need to be specified in every pass definition. Many other examples are possible. Another benefit of the invention is that the whole pass definition process is taken outside the scene-editing loop. Once the passes are defined, no manual labor is involved in implementing them after editing the 3-D scene. This may substantially decrease the labor that involved in working with passes.

In a preferred embodiment, the invention is implemented in a system that provides for continuous and automatic rendering of small preview pass images in the 3-D authoring environment. This, so called, in-context rendering system is described in copending US Patent Application entitled "A System for Editing Complex Visual Data Providing a Continuously Updated Rendering," the entirety of which is incorporated herein by reference. Briefly, the in-context rendering system restricts rendering to a small view region of the scene being worked on and updates it as the user simultaneously modifies the 3-D data. In the authoring environment, a preview of a pass rendering may be seen. This pass is identified as current. The render region discussed in the in-context rendering application scene shows the pass. This is accomplished by filtering the relevant scene data through the pass definition before rendering the region view. In this way, the region is rendered continuously as the underlying 3-D scene data is edited. For example, where a user works with two passes, a beauty pass and a matte pass, the beauty pass being current, the embodiment may function as follows:

1. The user sets the matte pass as current.
2. The beauty pass is flagged as non-current.
3. The setting implemented by the partitions of the beauty pass, if any, are retracted.
4. The settings implemented by the background partition are retracted.
5. The matte pass is flagged as current.
6. The settings of the background defined in the matte pass definition are implemented.
7. The settings of the partitions, if any, defined in the matte pass definition are implemented (geometry and lights).
8. Rendering and modification of scene data proceed as discussed in the copending application for the current pass.

Note that the user-interface may support changes directly to the 3-D scene data common to all passes and these may be automatically filtered through the current pass settings to derive the pass-scene which is then used for rendering. Alternatively, the pass scene data resulting from filtering the 3-D scene data through the current pass filter may be modified through the user-interface. Still another alternative, and preferable, 3-D scene data and pass definitions may be modified and the results of the changes simultaneously rendered in the in-context rendering system. Another feature useful in the in-context system for working with render passes is the ability to re-render the image(s) when a new pass is made current. A change in the current pass would have the same effect as other kinds of scene modifications in that the in-context system must determine which tiles must be updated as a result of the change in current pass.

The above system is preferably implemented in an object-oriented programming framework. In broad terms, the following components may be defined.

Render System

The entire rendering system is wrapped by this object. Most of the features identified in the in-context system described in the copending application are subsumed by this object except that they are applied to a current pass.

Pass Container

This object contains the collection of pass definitions for the project. The pass container performs pass management functions and related operations. It sets a pass as current, retracts current pass settings from objects in the scene and sets all the settings of the current pass as active, as discussed above.

Render Pass

The render pass object encapsulates the settings enumerated above. When a pass is made current, the rendering properties are sent to the rendering engine. The camera is specified. Environment and output shaders are set. Afterwards, the background and other geometry properties are assigned to the entire scene. Then settings of each partition are applied to the objects overriding any settings defined in the scene definition. Any objects not in a partition receive the background settings. The background is maintained as a default so that these settings do not have to be defined as a separate partition embracing the remainder of the objects in a scene.

Note that a global pass definition may also be provided. A parameter that may go into a global definition would be, for example, a camera selection if the scene defines multiple camera objects.

Figure 3A:
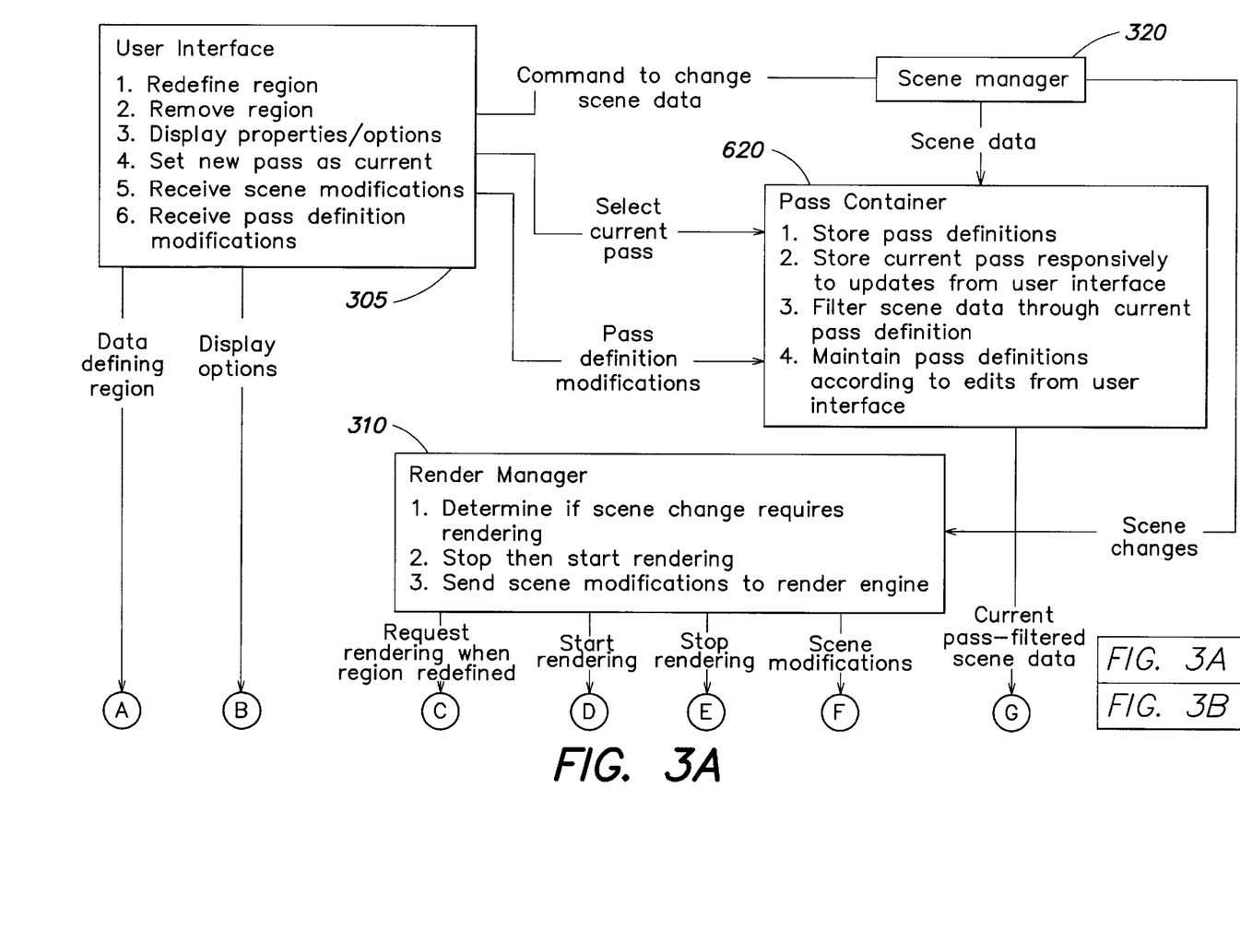
FIG. 3A and FIG. 3B are block diagrams showing data flow between objects and the functions of objects corresponding to one possible object-oriented implementation of the invention.
Figure 3B:
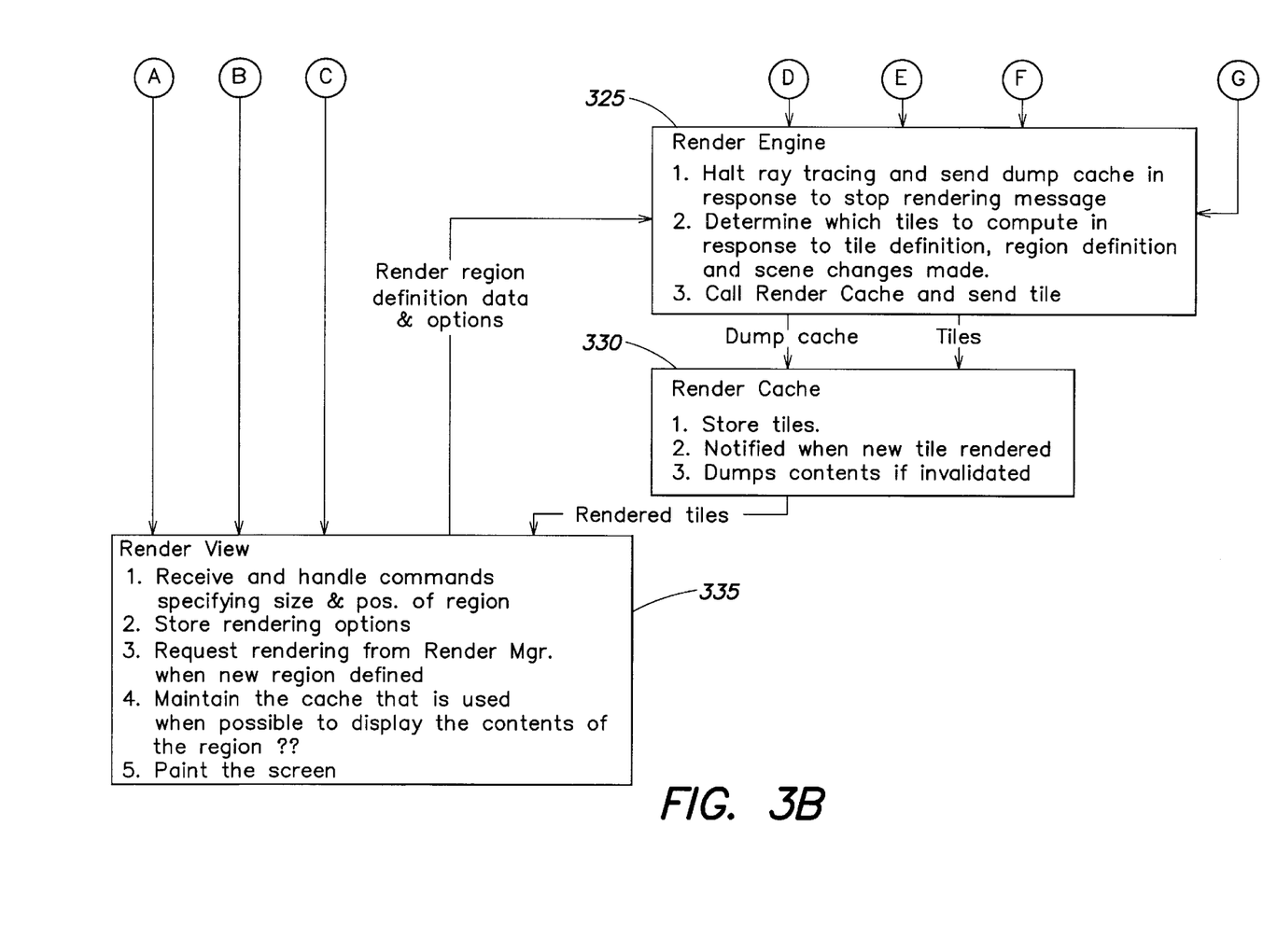

The following is a description of how the in-context rendering system may be modified to combine the pass generation feature of the present invention. Referring to FIG. 3, the invention may be folded into the object-oriented described in the copending application by adding a pass container object 620. FIG. 3 shows a particular example of objects and data flows that may be used as a framework for an object-oriented implementation. The architecture may be based on, for example, Microsoft's Component Object Model (COM) technology, with the components (objects) inter-operating using custom COM interfaces. The following description is abstracted and each object described could actually consist of a number of component objects that interact to provide the functions described. More information about COM technology may be found at http://www.microsoft.com/oledev. The architecture is based on the notification model. Components communicate asynchronously.

Three separate threads are defined in the example object-oriented implementation: (1) support for the user interface including the tasks associated with the pass container, (2) rendering, and (3) screen-painting of rendered portions. As discussed above, the user interface support function may have the higher priority. Alternatively, the separate threads may be controlled in some other way to insure the user-interface is not unduly slowed by the rendering thread. The pass container functions may be synchronous with the rendering thread, with the user-interface thread, or performed in a separate thread. Also, alternatively, the pass container process of filtering the scene data can be performed by the render engine object.

User Interface: A user interface object 305 handles functions supporting the user interface. In addition to the support of conventional user-interface features, the user-interface object 305 allows the render region to be positioned and sized. In addition to accepting scene definition data and modifications, it also supports user-entry of rendering options such as the zero-alpha compositing option and any others associated with the render region. The user-interface object also accepts modifications to pass definitions and the identification of a current pass. The latter two are transmitted to the pass container object 620. The conventional aspects of the user-interface provide for the tailoring of the wire-frame view over which the render region is painted. This data is used in performing the rendering. The user-interface 305 responds conventionally in the sense that it supports all functions conventionally-connected with the authoring environment.

Pass Container: The pass container object 620 stores pass definitions and maintains these according to pass modification data supplied from the user-interface object 305. The pass container 620 also maintains an identification of the current pass according to a selection transmitted from the user-interface. The pass container filters the scene data through the current pass definition so that scene data supplied to the render engine 325 has the properties of the current pass definition.

Render Manager: The render manager 310 is responsible for starting and stopping the render engine. This object receives scene changes and determines if the changes are of a type that may require a render region update (such as a change in a surface texture of an object) or a change that is not displayable (such as the name of an object or its grouping with other objects). When a change is determined to be displayable, the render manager halts rendering by sending a stop rendering command to the render engine. The updates are sent to the render engine so the render engine can determine which tiles (The render region view is divided in to adjacent portions called tiles) must be re-rendered.

The render manager 310 receives scene modifications from the user-interface and selectively passes these modifications to the render engine 325. If a scene modification is global in nature, the render manager determines this before passing the scene modification data to the render engine. If a global parameter, for example, the ambient light intensity of the scene, is modified, the rendering of the render region portion of the scene is invalidated. The render manager issues a corresponding command to the render engine that directs the render engine to abort any rendering processes. The render engine passes on a command to the render cache to empty the cache. This prevents the render engine and render cache from consuming resources unnecessarily by rendering parts of the scene that are invalid. In the instant embodiment, the rendering process proceeds tile by tile. When a global parameter, one that affects the entire rendering's appearance, is changed, the effect of the abort-rendering empty-cache commands is that the render engine stops rendering tiles and the render cache dumps any rendered tiles waiting to be picked up by render view to refresh the display of the render region. The render manager treats changes in the current pass the same as other scene modifications in terms of controlling the rendering thread.

When the user enters any commands to move or resize the render region, this data is sent from the user interface to the render view. The render view sends an indication of the change to the render manager so that the render manager can initiate re-rendering accordingly. Note, the modification of the render region may cause the same chain of events as scene modifications. That is, the render region must be updated when the region is redefined just as it must be updated when the scene is modified.

Render Engine 325: This object receives instructions to start and stop rendering from the render manager 310. Scene data are obtained from the pass container 620. A scene manager 320, a central warehouse of scene data, stores scene data which may be updated automatically responsively to scene modifications supplied from the user-interface. The pass container 620 filters the scene data through the current pass so that the properties defined in the current pass override those of the scene. Thus, the operations connected to maintenance of passes and the current pass are transparent to the rendering process.

Scene modifications resulting from user-input are supplied to the render engine 325 through the render manager 310. The render engine 325 can then determine what parts of the render region must be refreshed and perform the required rendering. In the preferred embodiment, as discussed, the image area is broken into tiles. Thus, the render engine, in that case, may determine from the dimensions (coordinates) of the tiles and the coordinates of the particular scene modifications, the particular tiles that must be re-rendered. The render engine 325 then renders those tiles sequentially, and as each tile's rendering is completed, apply the data defining the rendered tile to the render cache 330. This process of rendering the tiles proceeds in parallel with the maintenance of the user interface (accepting scene modifications, updating wire-frame views, etc.) and the scene-modification-filtering process performed by the render manager 310. The speed of updating the rendering is increased further by identifying and re-rendering only the tiles that are affected by the author's modifications. For example, if changes are made to the texture of a surface of an object, only certain tiles may need to be rendered again. The render engine continuously supplies rendered tiles to the render cache as the tiles are rendered.

Render engine 325 may send commands to render cache to blank invalid tiles so that the corresponding region shows nothing until a valid tile is supplied to render cache 330 to replace the invalid one. Alternatively, the latest valid tile may be left in place until a new one is received, which would enhance comparison of the "old" and "new" versions. As discussed elsewhere, this juxtaposition may be useful to the author. This feature may be included among the render options (e.g., Blank invalid tiles or Overwrite when updated). Another alternative is to dump the cache only when all the tiles are to be re-rendered and overwrite tiles when specific ones are determined to require rendering.

Render Cache 330: This object stores rendered tiles after the tiles are rendered by the render engine 325. The render cache 330 may also dispose of obsoleted tiles stored therein responsively to a command from the render manager 310 or render engine. Emptying render cache 330 has the effect of blanking the render region so that no objects are displayed until a valid rendering is available for the respective tiles.

Render View 335: This object receives, stores, and implements commands specifying the size and location of the render region 175. This render region definition data is also made available to the render engine 325 which may use it to determine the tiles to be rendered. The render view object 335 also stores rendering options, for example, sampling and painting speed. One example of a rendering option that can further enhance rendering speed is to, for purposes of rendering, specify that all lights are to be rendered as point lights rather than area lights, the former taking less time to render. These options may have to be supplied to the render engine.

What is claimed is:

1. A method of providing an image of a three-dimensional scene, comprising:

receiving scene definition data and storing the scene definition data, the scene definition data including geometric and non-geometric properties of objects in the three-dimensional scene;

receiving pass definition data and storing the pass definition data, the pass definition data including non-geometric properties, wherein the pass definition data includes multiple mutually exclusive pass parameter sets;

receiving an identification of a selection by an author of one of the pass parameter sets as current;

filtering a copy of the scene definition data using the selected pass parameter set to replace at least one non-geometric property of an object in the copy of the scene definition data with at least one non-geometric property of the pass parameter set;

rendering a view of a scene defined by the filtered copy of the scene definition data to produce the image according to the selected pass parameter set to the exclusion of other of the pass parameter sets;

displaying the image while accepting modifications to the three-dimensional scene and using said modifications to update scene definition data;

updating the filtering and rendering according to the modifications to the scene definition data.

2. A method of iteratively and automatically producing a rendering that may be displayed in an authoring user interface each time a 3-D scene is modified through the authoring user-interface, comprising:

storing pass definitions, wherein each pass definition defines properties of objects in the 3-D scene;

receiving an indication of a selection by an author of one of the pass definitions as current;

responsively to changes in the 3-D scene entered by the author into the authoring user-interface, determining properties to be used in the rendering according to the current pass definition, such that any property of the current pass definition that corresponds with a property of an object in the 3-D scene supersedes the corresponding property of the object in the 3-D scene; and rendering the 3-D scene according to the superseding properties defined by the current pass definition to the exclusion of other pass definitions.

3. A method in a computer system for creating and working with pass-images of a 3-D scene, comprising:

storing a 3-D scene, including data defining properties of objects in the 3-D scene;

storing pass data sets, each defining override properties corresponding to properties of objects in the 3-D scene;

receiving an indication of a selection by an author of one of the pass data sets;

rendering the 3-D scene using the selected pass data set such that at least one of the override properties of the selected pass data set and to the exclusion of other pass data sets determines a pass image resulting therefrom to replace at least one corresponding properties of objects in the 3-D scene; and editing the 3-D scene while displaying the rendered image.

4. A method for editing three-dimensional scenes, comprising:

receiving a specification of a three-dimensional scene in which objects have properties;

receiving a plurality of pass definitions, wherein each pass definition specifies properties to override corresponding properties of objects of the three-dimensional scene;

receiving an indication of a selection by an author of one of the plurality of pass definitions as a current pass definition;

filtering a copy of the three-dimensional scene using the current pass definition to the exclusion of the other pass definitions such that the specified properties in the pass definition override the corresponding properties of objects of the three-dimensional scene; and rendering the filtered copy of the three-dimensional scene to create a pass.

5. A computer program product, comprising:

a computer readable medium; and computer program instructions stored on the computer readable medium that, when executed by a computer, instruct the computer to perform a method for editing three-dimensional scenes, comprising:

receiving a specification of a three-dimensional scene in which objects have properties;

receiving a plurality of pass definitions, wherein each pass definition specifies properties to override corresponding properties of objects of the three-dimensional scene;

receiving an indication of a selection by an author of one of the plurality of pass definitions as a current pass definition;

filtering a copy of the three-dimensional scene using the current pass definition to the exclusion of the other pass definitions such that the specified properties in the pass definition override the corresponding properties of objects of the three-dimensional scene; and rendering the filtered copy of the three-dimensional scene to create a pass.

6. An apparatus for providing an image of a three-dimensional scene, comprising:

means for allowing an author to edit scene definition data and storing the scene definition data, the scene definition data including geometric and non-geometric properties of objects in the three-dimensional scene;

means for allowing the author to edit pass definition data and storing the pass definition data, the pass definition data including non-geometric properties, wherein the pass definition data includes multiple mutually exclusive pass parameter sets;

means for receiving an identification of a selection by the author of one of the pass parameter sets as current;

means for filtering a copy of the scene definition data using the selected pass parameter set to replace at least one non-geometric property of an object in the copy of the scene definition data with at least one non-geometric property of the pass parameter set;

means for rendering a view of a scene defined by the filtered copy of the scene definition data to produce the image according to the selected pass parameter set to the exclusion of other of the pass parameter sets;

means for updating the filtered copy of the scene definition data and for rerendering the filtered copy of the scene definition data while accepting modifications to the scene definition data through the means for editing the scene definition data.

7. An apparatus for iteratively and automatically producing a rendering that may be displayed in an authoring user interface each time a 3-D scene is modified through the authoring user-interface, comprising:

means for storing pass definitions, wherein each pass definition defines properties of objects in the 3-D scene;

means for receiving an indication of a selection by an author of one of the pass definitions as current;

means, operative in response to changes in the 3-D scene entered by the author into the authoring user-interface, for determining properties to be used in the rendering according to the current pass definition, such that any property of the current pass definition that corresponds with a property of an object in the 3-D scene supersedes the corresponding property of the object in the 3-D scene; and means for rendering the 3-D scene according to the superseding properties defined by the current pass definition to the exclusion of other pass definitions.

8. An apparatus for creating and working with pass-images of a 3-D scene, comprising:

means for storing a 3-D scene, including data defining properties of objects in the 3-D scene;

means for storing pass data sets, each defining override properties corresponding to properties of objects in the 3-D scene;

means for receiving an indication of a selection by an author of one of the pass data sets;

means for rendering the 3-D scene using the selected pass data set such that at least one of the override properties of the selected pass data set and to the exclusion of other pass data sets determines a pass image resulting therefrom to replace at least one corresponding properties of objects in the 3-D scene; and means for editing the 3-D scene while displaying the rendered image.

* * * * *